United States Patent Office 3,784,627
Patented Jan. 8, 1974

3,784,627
CATALYSTS AND PROCESS FOR DEHYDROGENATION
Brent J. Bertus, Bartlesville, Okla., assignor to Phillips Petroleum Company
No Drawing. Filed Feb. 28, 1972, Ser. No. 230,077
Int. Cl. C07c 3/28
U.S. Cl. 260—683.3                    9 Claims

ABSTRACT OF THE DISCLOSURE

Compositions prepared from (I) a transition metal compound of the iron group, (II) a Group II-A metal-containing compound, and (III) Group VI-A element-containing compound, are effective in a process to convert paraffins or monoolefins to a greater degree of unsaturation.

FIELD OF THE INVENTION

This invention relates to novel compositions. The inventon further relates to dehydrogenaton processes utilizing the compositions.

BACKGROUND OF THE INVENTION

A variety of dehydrogenation catalyst compositions and systems are known. However, the search for better and more effective catalyst compositions and processes continues.

OBJECTS OF THE INVENTION

It is an object of my invention to provide novel compositions. Another object of my invention is to provide novel catalysts. It is a further object of my invention to provide effective yields of desired products through dehydrogenation processes.

Other aspects, objects, and several other advantages of my invention will become apparent to those skilled in the art to which my invention most nearly pertains by consideration of my disclosure as presented in this specification including my appended claims.

SUMMARY OF THE INVENTION

According to my invention, novel compositions are formed by the combination of (I) a transition metal-containing component of the iron group, i.e., a compound of iron, cobalt, or nickel, (II) a Group II-A metal-containing component, and (III) a Group VI-A containing component.

These components, when formed into catalyst compositions, exhibit effective properties and abilities to convert, for example, a paraffin to an olefin, such as a butane to butene, or to convert a monoolefin to a diene, such as a butene to the corresponding butadiene, or to convert paraffins to dienes, and the like. The so-produced unsaturated monoenes and dienes are useful in preparation of valuable polymers, such as the polyolefins, or polymers of conjugated dienes such as polybutadiene useful in various rubber compositions.

DETAILED DESCRIPTION OF THE INVENTION

Compositions

The compositions of my invention comprise a combination of (I) a transition metal or transition metal-containing component of the fourth period of Group VIII of the Periodic Table, hereinafter termed the iron group, (II) a Group II-A metal or metal-containing component, and (III) a Group VI-A element or element-containing component from the third to the fifth period.

The (I) iron group components to which I refer are one or more of iron, cobalt, or nickel; presently preferred being nickel. The (II) Group II-A components are one or more of beryllium, magnesium, calcium, strontium, or barium; presently preferred being magnesium. The (III) Group VI-A components are one or more of sulfur, selenium, or tellurium; presently preferred being sulfur. The designations Group VIII, Group II-A, and Group VI-A refer to the Periodic Table of the Elements as set forth in Handbook of Chemistry and Physics, 49th ed. (1968–1969), The Chemical Rubber Co., Cleveland, Ohio, page B–3.

In my compositions as catalysts according to my invention, the relative amounts of each component can vary widely, so long as there is an effective relationship in the final composition produced, i.e., each component is present in an amount sufficient to provide catalytic effectiveness in the composition combination.

As a working broad range, the iron group component or components constitute about 20 to 85 weight percent; the Group II-A metal component or components about 1 to 30 weight percent; and the Group VI-A component or components about 1 to 40 weight percent; each component being calculated as the element itself.

It is presently preferred, although not necessarily so limited, that my compositions as catalysts reflect a range of about 25 to 65 weight percent for the iron group component or components together; from about 2 to 15 weight percent for the Group II-A component or components together; and from about 2 to 20 weight percent for the Group VI-A component or components; each component calculated as the element itself.

Two or more components from each group can be utilized to form my catalyst compositions. Where two or more components from a particular group are utilized, the combined weight percentage of such components reflects the weight percentage for the component as indicated within the broad and presently preferred ranges given hereinabove.

The total of (I), (II), and (III) need not equal 100 percent, since the elements contained in the finished calcined catalysts can be but are not necessarily in the elemental state. The elements can be combined, for example, with such as sufficient oxygen to form one or more compounds.

Substantially any element or compound or compounds of the aforementioned elements can be employed in such preparations, so long as none of the compounds are detrimental to the final oxidative dehydrogenation effectiveness of the catalyst compositions, and so long as elements other than the iron group metals, the Group II-A metals, the Group VI-A elements and combined oxygen in such compounds as are employed are substantially removed from the final catalyst compositions by appropriate washing or volatilization steps including drying, calcining, and the like, Of course, relatively minor amounts of some elements such as sodium which are present as more or less trace constituents in compounds being employed, or are present in a combined form not completely eliminated by drying, calcining, and the like, are not detrimental as long as they do not ordinately interfere in the effectiveness of my compositions nor in the processes in which they are employed.

The (I) iron group-containing component can be chosen broadly from any of the compounds of such elements. Presently preferred for convenience are the oxides or compounds convertible to the oxides on drying or calcining, such as the hydroxides or nitrates; and also useful are the halides including fluoride, chloride, bromide, iodide; the halates including the bromates and other equivalent halates; carboxylates such as acetates, propionates, tartrates, oxalates and the like; as well as mixtures thereof. The sulfates are applicable, and may be particularly suitable since the sulfur contained therein ultimately can represent the Group VI-A component in the final catalyst compositions. Presently preferred are compounds of nickel, more particularly oxides of nickel or compounds convertible thereto on calcination.

The (II) Group II-A metal-containing component or compound can be any applicable compound of a Group II-A metal. Compounds with Group VI-A elements can be utilized, such as magnesium sulfate, since such also will contribute or can contribute the (III) third component of the compositions of my invention. Otherwise, the Group II-A oxides or compounds convertible thereto presently are preferred. Of the sub-generic compounds within the (II) second component of my compositions, presently preferred are the magnesium compounds, and of these particularly such as magnesium sulfate, magnesium hydroxide or oxide.

The (III) element containing component for my compositions can be chosen from any of the elements of Group VI-A of the Periodic Table of the third, fourth, or fifth periods of the Periodic Table, more specifically sulfur, selenium, or tellurium. Presently preferred is sulfur.

It should be noted that any of the double compounds can be useful, such as ammonium magnesium sulfate and the like, and such compounds can be utilized in preparation of compositions according to my invention.

In general, any methods of preparation can be used which provide catalytic compositions containing the prescribed components in catalytically effective proportions. The compositions can be prepared by any suitable method known to the arts, including coprecipitation, impregnation, dry mixing, wet mixing, or the like, alone, or in various combinations. When the catalyst-forming ingredients have been suitably combined, they are generally calcined. The final calcined compositions should have a suitably high surface area so as to permit effective catalytic operations, and it is presently preferred that the compositions have a catalytical surface area of at least about one square meter per gram.

An illustrative method of catalyst preparation involves dry mixing one or more of the necessary components from each group, adding sufficient water or other convenient diluent or slurry-forming liquid so as to make a workable slurry, and intimately mixing the aforesaid components. The slurry can be dried to form a dried composite at any convenient drying temperature sufficient to volatilize the water or the diluent or diluents or suspending agents, such as from about 220 to 450° F. The dried composite can be activated by subjecting it to an elevated calcining temperature. Such elevated calcination or activation temperature can be any broad range usual for such preparations, such as of the order of about 900 to 1800° F. Suggested times usually are conveniently from about 0.1 to about 24 hours. Calcination and activation preferably include exposure of the composite during the calcination step to a molecular oxygen-containing gas such as air.

The catalyst compositions can be formed into any convenient shape or structure for utilization as catalyst entities, such as tablets, extrudates, finely divided powders, agglomerates, and the like, by means known to the art. For convenience in shaping, such particle-forming steps preferably are conducted prior to calcining, although by various crushing or compaction steps such can be accomplished subsequent thereto if preferred.

The catalyst compositions can be prepared with or without a support. Where desired for strength or catalyst distribution in various types of reactors, conventional supports can be utilized such as silica, boria, titania, zirconia, various types of alumina, and the like, as are well known in the art. When a support is utilized, the aforementioned weight ratios of each active component of my catalyst compositions are exclusive of such support or supports.

Dehydrogenation feedstocks

Organic feedstocks to which my compositions as catalysts can be applied in dehydrogenation processes are those feedstocks or feedstreams containing one or more dehydrogenatable organic compounds. Such compounds can be characterized as containing at least one

grouping. The compounds to be treated typically contain in the range of 2 to 12 carbon atoms per molecule, although such range is more from present commercial availability of feedstocks than from limitation of the scope of my invention. It is feasible to treat compounds containing a greater number of carbon atoms. The upper carbon limitation just mentioned does not indicate a limitation on effectiveness of my catalyst and processes, but only refers to what may be commercially available in the way of feedstocks.

Particularly applicable for my process employing my compositions as catalysts are the paraffins and monoolefins, including cyclic and acyclic, more particularly acyclic, any or all of which can be branched or unbranched. Such feedstocks can be utilized as a relatively pure feedstock, i.e., a single compound, or diluted with an inert diluent such as nitrogen; or can be mixed feedstocks available from various refinery streams and containing a variety of components, some dehydrogenatable, some perhaps not. The conversion of butane to butenes, butane to butenes and/or butadiene, isopentane to isoamylenes and isoprene, and butenes to butadiene, presently are considered most advantageous. Representative other feedstocks or dehydrogenatable feedstock components include ethane, propane, isobutane, pentane, cyclopentane, hexane, 2-methyl-hexane, octane, 2,4-dimethyloctane, 2-methylbutene-1, hexene-2, octene-1, 3-methylnonene-4, dodecene-1, and the like, alone or in admixture.

Dehydrogenation conditions

In dehydrogenation processes, particularly oxidative dehydrogenation processes, the hydrocarbon feedstock or hydrocarbon-containing feedstock, generally together with a molecular oxygen-containing gas, optionally further with steam, is formed into an admixture, usually preheated, is contacted with a composition of my invention as catalyst in any suitable reaction zone under contacting conditions suitable or necessary for the degree or extent of conversion desired. The compositions as catalysts can be utilized in any contacting method or reaction mode known to the catalyst and dehydrogenation arts, employing any mode of contacting, such as continuous operation using the presently preferred fixed catalyst bed or beds in a single contacting zone, or plurality of contacting zones, or by other contacting methods such as fluidized beds, and the like.

Feedstocks can be dehydrogenated with a process using the compositions according to my invention over any broad range of contacting conditions, temperature, pressure, space rates, and the like, presently employed in such arts. Suggested contacting temperatures cover a broad range such as from 800 to 1300° F., presently preferred from about 1000 to 1200° F. for improved conversion and selectivity; with contacting pressures of from about 0 to about 250 p.s.i.a.; utilizing a hydrocarbon:oxygen ratio of about 1:0.1 to about 1:4, preferably from about 1:0.5 to 1:1.5 for best conversion. Air is the preferred free oxygen-containing gas.

The use of steam is beneficial for heat transfer purposes to remove heat of reaction. Where steam is so employed, a steam:hydrocarbon ratio of up to about 50:1 or more can be utilized. Hydrocarbon feed rates can be within any range generally employed in dehydrogenation arts, with ranges presently suggested from about 50 to 5000 presently preferred from about 200 to 1000 GHSV.

The effluent from the contacting zone or zones can be subjected to any suitable separation method or methods so as to isolate and recover desired product or products, to separate unconverted or partially converted feedstocks or components in order to provide recycle or for other use in the modern integrated chemical-refinery-petrochemical processing operation which more and more frequently is being termed a petrocomplexity.

My compositions as catalysts, employed under appropriate conditions, have a long, active life, and seldom need, if ever, to undergo regeneration. However, regeneration can be readily accomplished should such become indicated or is desired, according to operational controls, or because of inactivation possibly attributable to minor amounts of poisons in the feedstock or inadvertently introduced or for other reasons. Regeneration can be accomplished by ceasing the flow of feedstock, generally continuing the flow of oxygen-containing gas, preferably also of steam where such is employed or is available, and otherwise maintaining operating conditions of temperature and the like for a sufficient time to restore substantial activity to the catalyst compositions in the reaction zone. Of course, if preferred, the catalyst compositions can be removed from the reaction zone and separately regenerated elsewhere, if more convenient.

In processes and reactions of my invention, carbon oxides and water of course are formed either by chemical reactions, or in the case of water also by condensation of steam in the recovery of the products. Trace amounts of other oxygenated products may be formed. For example, trace amounts of ether compounds such as furan, aldehydes such as acetaldehyde, furfural, minor amounts of acids such as acetic acids, can be obtained. Some minor amounts of cracked products also may be formed which themselves may be desirable, such as butadiene as a by-product of oxidative dehydrogenation of isopentane to isoprene. Such components can be readily separated by means known to the art and utilized for recycle or other application in the petrocomplexity.

EXAMPLES

The following examples are intended to illustrate the use of my compositions as catalysts. These examples, and the particular components and conditions as used therein, are intended to be illustrative of my invention and not limitative of the reasonable and proper scope thereof.

In the data reported, percent conversion is defined as moles hydrocarbon converted/100 moles of hydrocarbon butane in the feed. Modivity is defined as a modified selectivity in moles monounsaturated plus moles diunsaturate per 100 moles hydrocarbon converted based on analysis of gas phase products for converted hydrocarbons, oxides of carbon, and unconverted feed. Conversion/yield are reported on same basis as modivity.

EXAMPLE I

Compositions of my invention were made employing as the (I) component nickel oxide, and as the (II) and (III) component, magnesium sulfate heptahydrate. The dry materials, or in the case of the heptahydrate, the apparently dry material, were dry mixed intimately, moistened with sufficient distilled water to form a workable slurry for further admixing, and the slurry dried at a temperature of about 300° F. in air for about two hours. The dried composition was calcined at a temperature of about 1200° F. in air overnight. The final calcined composition was ground to about 20–35 mesh. The composition contained 59.3 weight percent nickel, 5 weight percent magnesium, 16.5 weight percent sulfur, each component expressed as the element.

The so-prepared composition was employed as catalyst in runs utilizing a hydrocarbon feed rate of 200 GHSV butane, 200 GHSV oxygen (air was used), and 2000 GHSV steam, for conversion of butane to products of a greater degree of unsaturation. Atmospheric pressure was employed in the runs, and the sample was taken at about 60 minutes reaction time. The following data reflect results obtained:

TABLE I

| Run No. | Temp., °F. | Percent | | Yield, percent | | |
|---|---|---|---|---|---|---|
| | | Conversion | Modivity | $C_4H_8$ | $C_4H_6$ | Total $C_4$ olefins |
| 1 | 1,000 | 29.8 | 57.4 | 11.4 | 5.7 | 17.1 |
| 2 | 1,100 | 38.9 | 49.2 | 10.7 | 8.4 | 19.1 |
| 3 | 1,200 | 48.8 | 25.3 | 3.2 | 9.2 | 12.4 |

The above data reflect effective conversion, modivity, and desirable yields in conversion of butane with catalysts of my invention in a process of dehydrogenation under oxidative dehydrogenation conditions. It will be observed that suitable temperatures can be selected to give desired combination of conversion and modivity.

EXAMPLE II

Further catalyst compositions were prepared using varying amounts of nickel nitrate tetrahydrate and magnesium sulfate heptahydrate. The components were admixed and the catalyst compositions prepared as described in Example I above. The compositions of the several catalysts prepared are given in Table II–1 below:

TABLE II-1

| Catalyst No. | Grams | | Weight percent [1] | | |
|---|---|---|---|---|---|
| | $Ni(NO_3)_2 \cdot 4H_2O$ | $MgSO_4 \cdot 7H_2O$ | Ni | Mg | S |
| 2 | 40 | 9.6 | 56.0 | 5.8 | 7.6 |
| 3 | 100 | 20 | 58.9 | 5.1 | 6.7 |
| 4 | 50 | 45 | 31.5 | 12.1 | 15.9 |
| 5 | 100 | 45 | 33.7 | 11.5 | 15.2 |
| 6 | [2] 100 | 0 | 78.6 | 0 | 0 |

[1] As element.
[2] 100% NiO.

The catalysts described above in Table I then were tested for butane conversion under oxidative dehydrogenation conditions employing a contacting temperature of 1000° F., otherwise conditions as described above in Example I. The results are shown below in Table II–2:

TABLE II-2

| Run No. | Catalyst No. | Percent | | Yield, percent | | |
|---|---|---|---|---|---|---|
| | | Conversion | Modivity | $C_4^=$ | $C_4^=$ | Total $C_4$ olefins |
| 4 | 2 | 36 | 58 | 11.6 | 9.5 | 21.1 |
| 5 | 3 | 34 | 57 | 10.3 | 8.2 | 18.5 |
| 6 | 4 | 22 | 55 | 10 | 2 | 12 |
| 7 | 5 | 23.4 | 47.5 | 7.8 | 3.3 | 11.1 |
| 8 | 6 | 70 | 0 | 0 | 0 | 0 |

As will be observed from data shown in Table II–2 above, a nickel oxide catalyst in Run 8 gave high conversion, but no desired products at all, the butane feed having been converted substantially entirely to carbon oxides. However, Runs 4–7 inclusive using catalysts of the invention with varying proportions of Ni, Mg, and S, substantial activity and modivity for the production of valuable dehydrogenation products.

Example III

Additional catalyst composition was prepared employing 100 grams nickel nitrate tetrahydrate, 45 grams magnesium sulfate heptahydrate, and 10 grams sulfuric acid. The components were mixed by stirring, heated to 300° F., and dried in air for 2 hours. The dried composition was calcined in air overnight at about 1200° F. The calcined composition was ground to 20–35 mesh. The catalyst contained 38.6 weight percent nickel, 7.5 weight percent magnesium, 15.8 weight percent sulfur, each component as the element.

The catalyst was tested for conversion of butane under oxidative dehydrogenation conditions as described above for Example II. A conversion of 29.5 percent was obtained with modivity of 54.2 percent. Product yield was 10.2 percent butenes, 5.8 percent butadienes, with total $C_4$ olefins of 16 percent. This again shows the effectiveness of compositions as catalysts in a process according to my invention, using compositions prepared from other starting materials.

The disclosure and data have shown the value and effectiveness of my invention. Reasonable variations and modifications certainly are possible within my disclosure, yet without departing from the reasonable scope and spirit thereof.

I claim:
1. A dehydrogenation process employing a catalyst composition consisting essentially of (I) cobalt or nickel, (II) beryllium, magnesium, calcium, strontium, or barium, (III) sulfur, selenium, or tellurium, and (IV) oxygen with one or more of said (I), (II), and (III) wherein the weight percent of each of said (I), (II) and (III) calculated as the element is in a ratio of each to the other sufficient to provide oxidative dehydrogenation catalytic effectiveness, wherein at least one dehydrogenatable organic compound containing at least one

grouping is contacted with said catalyst composition under oxidative dehydrogenation conditions including the presence of a molecular oxygen-containing gas.

2. The oxidative dehydrogenation process according to claim 13 wherein in said catalyst composition said (I) represents about 20 to 85 weight percent, said (II) about 1 to 30 weight percent, and said (III) about 1 to 40 weight percent of the total of said catalyst composition.

3. The process according to claim 2 wherein said at least one dehydrogenatable organic compound is a paraffin or monoolefin, and said dehydrogenatable organic compound contains from 2 to 12 carbon atoms per molecule.

4. The process according to claim 3 wherein said process further employs steam.

5. The process according to claim 4 wherein said oxidative dehydrogenation conditions include a contacting temperature of about 800 to 1300° F., a contacting pressure of about 0 to 250 p.s.i.a., a hydrocarbon:oxygen ratio of about 1:0.1 to 1:4, a steam:hydrocarbon ratio of up to about 50:1, and a hydrocarbon feed rate of about 50 to 5000 GHSV.

6. The process according to claim 5 employing a contacting temperature of about 1000 to 1200° F., a hydrocarbon:oxygen ratio of about 1:0.5 to 1:1, and a hydrocarbon feed rate of about 200 to 1000 GHSV.

7. The process according to claim 5 wherein said (I) is nickel, said (II) is magnesium, and said (III) is sulfur.

8. The process according to claim 7 wherein said hydrocarbon is a paraffin.

9. The process according to claim 7 wherein said paraffin is n-butane, and said catalyst composition contains from 31 to 60 weight percent nickel, from 5 to 13 percent magnesium, and from 6 to 17 percent sulfur.

References Cited
UNITED STATES PATENTS

| | | | |
|---|---|---|---|
| 3,666,687 | 5/1972 | Croce | 252—439 |
| 3,590,090 | 6/1971 | Cohen et al. | 260—680 E |
| 3,456,026 | 7/1969 | Cohen II | 260—683.3 |

DELBERT E. GANTZ, Primary Examiner

J. M. NELSON, Assistant Examiner

U.S. Cl. X.R.

260—680 E; 252—439

UNITED STATES PATENT OFFICE
CERTIFICATE OF CORRECTION

Patent No. 3,784,627                    Dated January 8, 1974

Inventor(s)  Brent J. Bertus

It is certified that error appears in the above-identified patent and that said Letters Patent are hereby corrected as shown below:

Claim 2, Column 7, line 34, "13" should read -- 1 --.

Signed and sealed this 4th day of June 1974.

(SEAL)
Attest:

EDWARD M. FLETCHER, JR.                C. MARSHALL DANN
Attesting Officer                       Commissioner of Patents